(12) United States Patent
Schimpf et al.

(10) Patent No.: US 9,477,705 B2
(45) Date of Patent: Oct. 25, 2016

(54) DYNAMICALLY CREATING QUERIES TO FIND RELATED RECORDS IN A DATABASE

(75) Inventors: Brian C. Schimpf, Harvard, MA (US); Sreedhar Rella, Westford, MA (US); Vaughn T. Rokosz, West Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/621,142

(22) Filed: Sep. 15, 2012

(65) Prior Publication Data

US 2013/0013637 A1 Jan. 10, 2013

Related U.S. Application Data

(63) Continuation of application No. 12/647,965, filed on Dec. 28, 2009.

(51) Int. Cl.
*G06F 17/30* (2006.01)

(52) U.S. Cl.
CPC ................ *G06F 17/30398* (2013.01)

(58) Field of Classification Search
None
See application file for complete search history.

(56) References Cited

U.S. PATENT DOCUMENTS

| | | | |
|---|---|---|---|
| 5,742,763 A * | 4/1998 | Jones | 719/317 |
| 5,787,411 A * | 7/1998 | Groff et al. | |
| 6,553,371 B2 * | 4/2003 | Gutierrez-Rivas | G06F 17/30392 |
| 2005/0131889 A1 * | 6/2005 | Bennett et al. | 707/4 |
| 2005/0273697 A1 * | 12/2005 | Weinberg | G06F 17/245 715/275 |
| 2006/0161533 A1 * | 7/2006 | Selca et al. | 707/3 |
| 2007/0038597 A1 * | 2/2007 | Sauermann | G06F 17/30469 |
| 2009/0089251 A1 * | 4/2009 | Johnston et al. | 707/3 |
| 2009/0100360 A1 * | 4/2009 | Janzen | G06Q 10/06 715/764 |
| 2009/0265370 A1 * | 10/2009 | Rucker et al. | 707/102 |
| 2010/0070459 A1 | 3/2010 | Zigon et al. | |
| 2010/0161644 A1 | 6/2010 | Crim et al. | |

OTHER PUBLICATIONS

FileMaker Pro 9 User's Manual, retrieved on Jul. 8, 2013, retrieved from the Internet <URL: http://www.filemaker.com/products/filemaker-pro/docs/9/fmp9_users_guide.pdf>.*
Microsoft, Locate duplicates by using conditional formatting, retrieved on Jan. 6, 2014, retrieved from the Internet <URL: http://office.microsoft.com/en-us/excel-help/locate-duplicates-by-using-conditional-formatting-HA001136616.aspx>.*
(Continued)

*Primary Examiner* — Tyler Torgrimson
(74) *Attorney, Agent, or Firm* — Yee & Associates, P.C.; Maeve M. Carpenter

(57) ABSTRACT

A system that generates display objects in a graphical user interface that enable the user of an application which accesses a data repository through result sets to dynamically construct a new query to show all database records having the same contents as a specified set of fields in a currently active database record. Display objects are further generated that enable the user to specify how the contents of the selected fields are to be matched (e.g. exact matching, inclusion, etc.) and/or logical relationships between specified field contents (e.g. Boolean operators such as AND, OR, NOT, etc.). In one embodiment, once a query is defined in this way, it is stored, for example in the user's profile, so that the user can access it across uses of the application.

18 Claims, 5 Drawing Sheets

(56) References Cited

OTHER PUBLICATIONS

"The Content Query Web Part", http://pathtosharepoint.wordpress.com/2009/06/08/the-content-query-web-part/, Jun. 8, 2009, pp. 1-3.

Bob Tabor, "Dynamic drill-down DataGrid", http://searchwindevelopment.techtarget.com/tip/0,289483,sid8_gci833650,00.html, Oct. 11, 2002, pp. 1-3.

"Viewing and Managing Record Information", http://www.sugarcrm.com/docs/User_Guides/Professional_UserGuide_5.0/User_Interface.4.3.html, 2004-2008, pp. 1-3.

Wright, Dwayne, "Zero or More Characters", [online], www.dwaynewright.com Sep. 17, 2009 [retrieved on Jun. 27, 2012]. Retrieved from the internet <URL: http://www.dwaynewright.com/filemaker-terms/2009/9/17/zero-or-more-characters.html>.

* cited by examiner

RELATIONAL REQUIREMENTS
USER INTERFACE
DISPLAY OBJECT 64

SELECTED FIELD 62

CURRENTLY ACTIVE DATABASE RECORD 60

Fig. 3

| | AND |
|---|---|
| Exact match | |
| Contains | OR |
| Greater than | NOT |
| Less than | |

RELATIONAL REQUIREMENTS
AND LOGICAL OPERATIONS
USER INTERFACE
DISPLAY OBJECT 74

SELECTED FIELD 72

SECOND TAB 70 OF CURRENTLY ACTIVE DATABASE RECORD 60

Fig. 5

DYNAMICALLY CREATING QUERIES TO FIND RELATED RECORDS IN A DATABASE

CROSS REFERENCE TO RELATED APPLICATIONS

The present application is a Continuation application under 35 U.S.C. 120 of commonly owned prior application Ser. No. 12/647,965, filed on Dec. 28, 2009 in the names of Brian C. Schimpf et al., currently pending, all disclosures of which are hereby included by reference.

FIELD OF THE INVENTION

The present invention relates generally to database systems, and more specifically to a method and system for dynamically creating queries to find related records in a database.

BACKGROUND OF THE INVENTION

As it is generally known, many modern applications include the capability to access information stored in a repository such as a relational database. Typically, the user runs a query requesting all database records that meet a set of specified criteria for contents of fields in the database schema. One such application is a software defect tracking system, in which a user can run queries requesting defect records matching certain criteria. For example, the user of a defect tracking system may request defect records from the database that have been reported against a certain software version, that relate to a specific component or feature of a product in question, that are in a certain state, etc.

A situation may arise where the user is looking at a specific record in a result set and become interested in seeing similar records that share certain field contents with that record. For example, an engineer currently looking at a specific defect reported by external customers may be interested in seeing records for all defects reported by exactly the same set of customers. Or the engineer may be interested in seeing records for all defects reported by the same submitter and against the same component. Under these circumstances, the fields of interest for such "related records" may be different from the field criteria used in the original database query.

In existing systems, in order to address this need, the user must construct a new query based on the new set of desired criteria. However, this requires the user to stop what he or she is currently doing, construct the desired new query, and run it. Instead, it would be desirable to have a system that conveniently and dynamically constructs a desired new query based on field contents directly identified in the current record by the user as important. Such a new system would allow the user to request a new set of results matching their specific needs. With such a system, the user would, for example, be able to conveniently request all records for defects which have been reported by exactly the same set of customers that identified a defect in a currently active record.

Previous approaches have been deficient in this regard. For example, SharePoint® web application framework by Microsoft Corporation can be used when hosting a Web site that accesses shared workspaces, information stores and documents, as well as host defined applications such as wikis and blogs. Users can manipulate proprietary controls called "web parts" that are controls the designer can embed in web pages. The Content Query web part allows users to build and run queries. These queries specify which items are displayed, and the user can set presentation options to determine how the items are displayed on the finished page. However, like other existing solutions, Content Query web parts require the user to build and run queries "manually" based on the user's understanding of what he or she wants to see. Such solutions fail to build queries dynamically based on the contents of specified fields within a selected record.

Other previous approaches have allowed the user to access child records in a hierarchical relationship of records. Examples of this approach include DataGrid™ controls by Microsoft Corporation and SugarCRM® customer relationship management system by SugarCRM Corporation. These techniques also do not address the need to find records with matching contents in user specified fields of a current record without any other relationship between the records.

For the above reasons and others it would accordingly be desirable to have a new automated solution that effectively supports dynamically creating queries to find related records in a database.

SUMMARY OF THE INVENTION

To address the above described and other shortcomings of previous systems, a solution is disclosed that dynamically creates queries to find related records in a database. The disclosed system generates display objects in a graphical user interface that enable the user of an application which accesses a data repository through result sets to dynamically construct a new query to show all database records having the same contents as a specified set of fields in a currently active database record. Display objects are further generated that enable the user to specify how the contents of the selected fields are to be matched (e.g. exact matching, inclusion, etc.) and/or logical relationships between specified field contents (e.g. Boolean operators such as AND, OR, NOT, etc.). In one embodiment, once a query is defined in this way, it is stored, for example in the user's profile, so that the user can access it across uses of the application.

Thus there is disclosed an automated solution that effectively supports dynamically creating queries to find related records in a database.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 3 is a first simplified screen shot showing examples of user interface display objects generated by an illustrative embodiment of the disclosed system;

FIG. 5 is a third simplified screen shot showing examples of user interface display objects generated by an illustrative embodiment of the disclosed system.

DETAILED DESCRIPTION OF EXEMPLARY EMBODIMENTS

Figure 1:
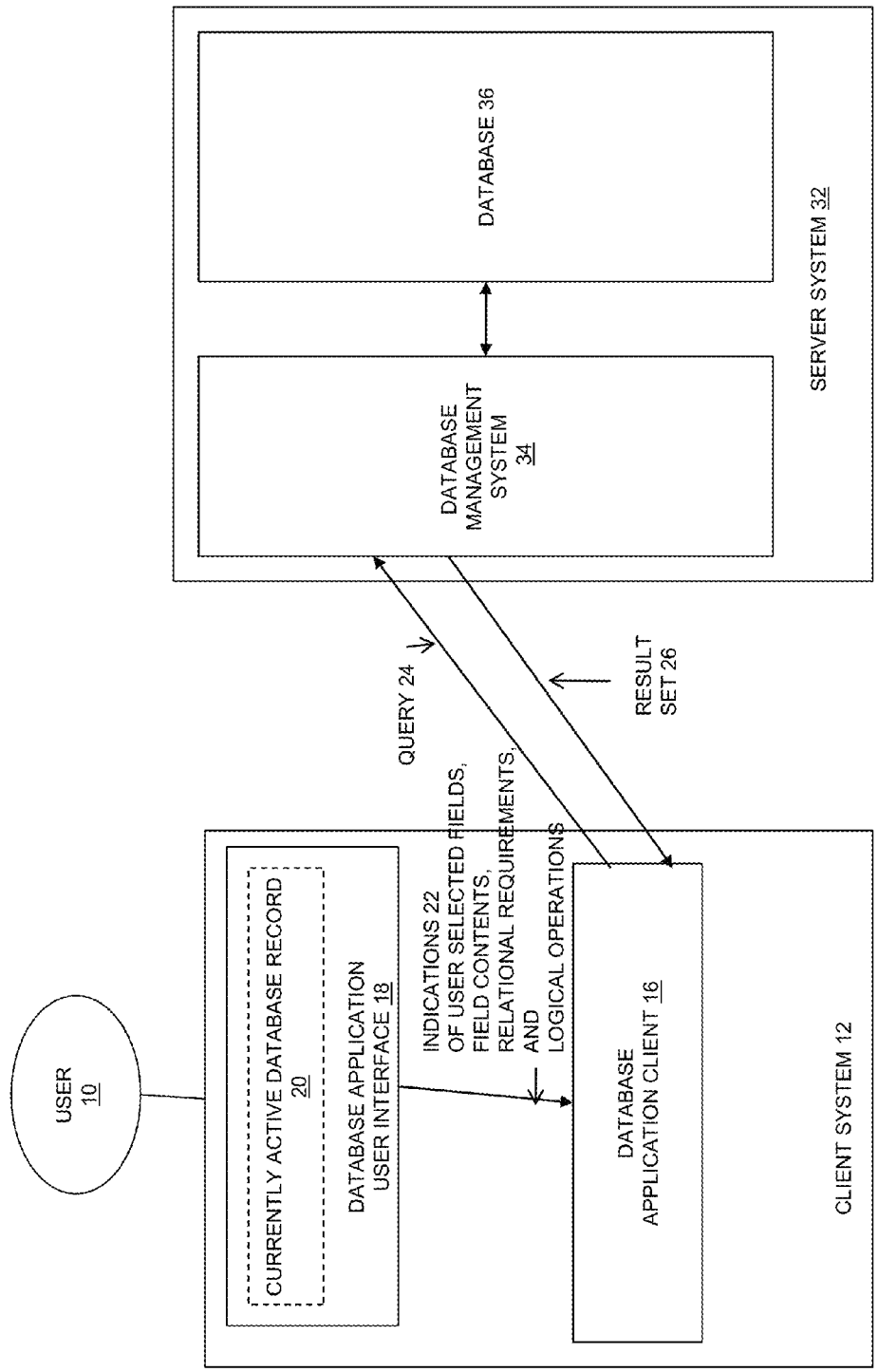
FIG. 1 is a block diagram showing components in an illustrative embodiment of the disclosed system.

FIG. 1 is a block diagram showing hardware and software components in an illustrative embodiment of the disclosed system. As shown in FIG. 1, User 10 is associated with a Client System 12, which may include a Database Application Client 16. The Database Application Client 16 generates a Database Application User Interface 18, including a display of a Currently Active Database Record 20.

During operation of the embodiment shown in FIG. 1, the User 10 selects a number of fields within the Currently Active Database Record 20, and may further select one or more relational requirements and logical operations through display objects generated within the Database Application User Interface 18. Indications 22 of such user selected fields and their values, relational requirements and logical operations, are received through the Database Application User Interface 18 by the Database Application Client 16. Based on this received information, the Database Application Client 16 constructs a database Query 24 that is passed to a database management system, such as the Database Management System 34 shown in the Server System 32. The Database Management System 34 uses the Query 24 to retrieve database records from the Database 36 that conform to the requirements of the Query 24. The database records returned by the Database 36 to the Database Management System 34 are returned to the Database Application Client 16, as shown by the Result Set 26. The Database Application Client 16 then displays indications of the database records to the User 10, for example as a list of records within the Database Application User Interface 18. The User 10 can then select one of the records in the list of records in the result set as a new Currently Active Database Record 20. Operation of the illustrative embodiment of FIG. 1 and other alternative embodiments is further described below and in the subsequent figures.

Those skilled in the art will recognize that while the embodiment of FIG. 1 uses a client-server implementation, the disclosed system may alternatively be embodied using a peer-to-peer architecture, in which no server system is required. In such an alternative embodiment, the database management system and database is stored on one or more client systems, and operations described above as being performed by the Server System 32 are performed in such client systems.

While for purposes of concise illustration only one user and client system are shown in FIG. 1, those skilled in the art will recognize that the disclosed system may be embodied such that any specific number of users may use the disclosed system. Similarly, while for purposes of concise illustration only one server system is shown in FIG. 1, the disclosed system may be embodied such that any specific number of server systems are used to perform the operations described in association with the Server System 32.

The Client System 12 of FIG. 1 may include any specific type of a computer system and/or intelligent electronic device, such as a desktop, laptop, or palmtop computer system, or a personal digital assistant, cell phone, and/or other electronic device. Client System 12 may include or control a display device that is capable of displaying a graphical user interface including Database Application User Interface 18 to User 10, such as a liquid crystal display (LCD), cathode ray tube (CRT), interferometric modulator display (IMOD), light emitting diode (LED), or the like.

Those skilled in the art will recognize that the Database Application Client 16 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client System 12 may include one or more processors, and program storage, such as memory, for storing program code executable on such processors (e.g. Database Application Client 16, and/or other application and/or operating system program code), as well as other input/output devices and/or other external interfaces.

Server System 32 may also be embodied as any specific type of computer system including one or more processors, and program storage, such as memory, for storing program code executable on such processors (e.g. Database Management System 34, and/or other application and/or operating system program code), as well as for storing data and/or databases or the like such as Database 36. Server System 32 may further include a number of input/output devices and/or other external interfaces. Those skilled in the art will further recognize that Database Management System 34 may also be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware.

The Client System 12 and Server System 32 may be communicably connected using any specific kind of data communication network and/or protocol.

Figure 2:
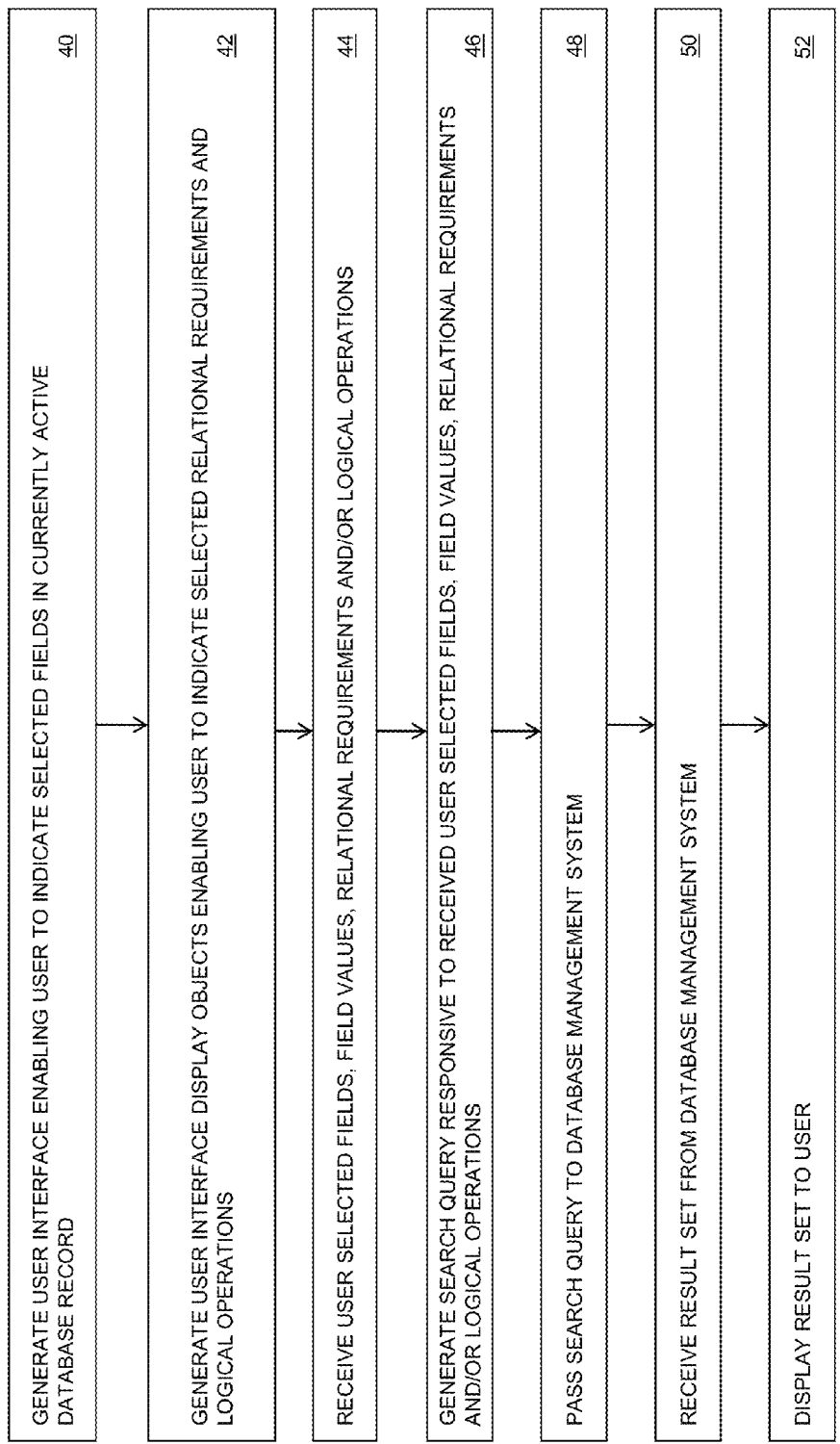
FIG. 2 is a flow chart showing steps performed during operation of an illustrative embodiment of the disclosed system.

FIG. 2 is a flow chart showing steps performed during operation of an illustrative embodiment of the disclosed system. The steps of FIG. 2 may, for example, be performed by the Database Application Client 16 and/or Database Management System 34 of FIG. 1.

At step 40, the disclosed system generates a user interface (e.g. Database Application User Interface 18) enabling the user to indicate selected fields within a currently active database record (e.g. Currently Active Database Record 20). At step 42, the disclosed system generates display objects within the user interface that enable the user to indicate selected relational requirements and/or logical operations. The display objects generated at step 42 may enable the user to indicate relational requirements that must be met for the contents of a field in a database record to be considered as "matching" the contents of an associated one of the fields in the currently active database record selected at step 40. For example, the relational requirements may include "Exact Match", "Contains", "Greater Than" and/or "Less Than", or other specific relational requirements. In the case of "Exact Match", the disclosed system generates a search query such that the contents of a corresponding field in a database record must exactly match the contents of the associated field in the currently active database record to be considered a match. In the case of "Contains", the disclosed system generates a search query such that the contents of a corresponding field in a database record must contain the contents of the associated field in the currently active database record to be considered a match. In the case of "Greater Than", the disclosed system generates a search query such that the contents of a corresponding field in a database record must be greater than the contents of the associated field in the currently active database record to be considered a match. And similarly, in the case of "Less Than", the disclosed system generates a search query such that the contents of a corresponding field in a database record must be less than the contents of the associated field in the currently active database record to be considered a match.

The display objects generated at step 42 may also enable the user to indicate logical (e.g. Boolean) operations apply across multiple fields to determine whether a database record is a match with regard to the user selected fields in the currently active database record. For example, the logical operations may include "AND", "OR", and/or "NOT", or other specific logical operations. In the case of "AND", the disclosed system generates a search query such that the contents of both a first field and a second field in a database record must match the contents of the associated fields in the currently active database record for the database record to be considered a match. In the case of "OR", the disclosed system generates a search query such that the contents of one or the other of a first field and a second field in a database record must match the corresponding field in the currently active database record for the database record to be considered a match. In the case of "NOT", the disclosed system generates a search query such that the contents of a first corresponding field in a database record must match the contents of the corresponding field in the currently active database record and the contents of a second corresponding field in the database record must not match the contents of the corresponding field in the currently active database record for the database record to be considered a match.

At step 44, the disclosed system receives indications of the user selected fields, field values, relational requirements and/or logical operations. At step 46, the disclosed system generates a search query that reflects the field selections at step 40, as well as the relational requirements and logical operations selected at step 42. The search query generated at step 46 may be any specific type of query, such as a Structured Query Language (SQL) query, Object Query Language (OQL) query, or any other type of query. The search query generated at step 46 is then passed to a database management system at step 48, which performs a search on the database using the query. The matching records in the database are passed in a result set from the database management system to the database application client and received at step 50. The database application client then displays the records in the result set to the user at step 52, for example in a list of records from which the user can select an individual record to be the currently active database record.

In one embodiment, the search query generated at step 46 is persistently stored so that the user can submit it to the database management system again in the future. In such an embodiment, the disclosed system may operate to request that the user input a name for the search query, and then store the search query under the associated query name in the user's profile, or in a list, directory or a library of search queries that remains available to the user across application sessions.

Figure 3:
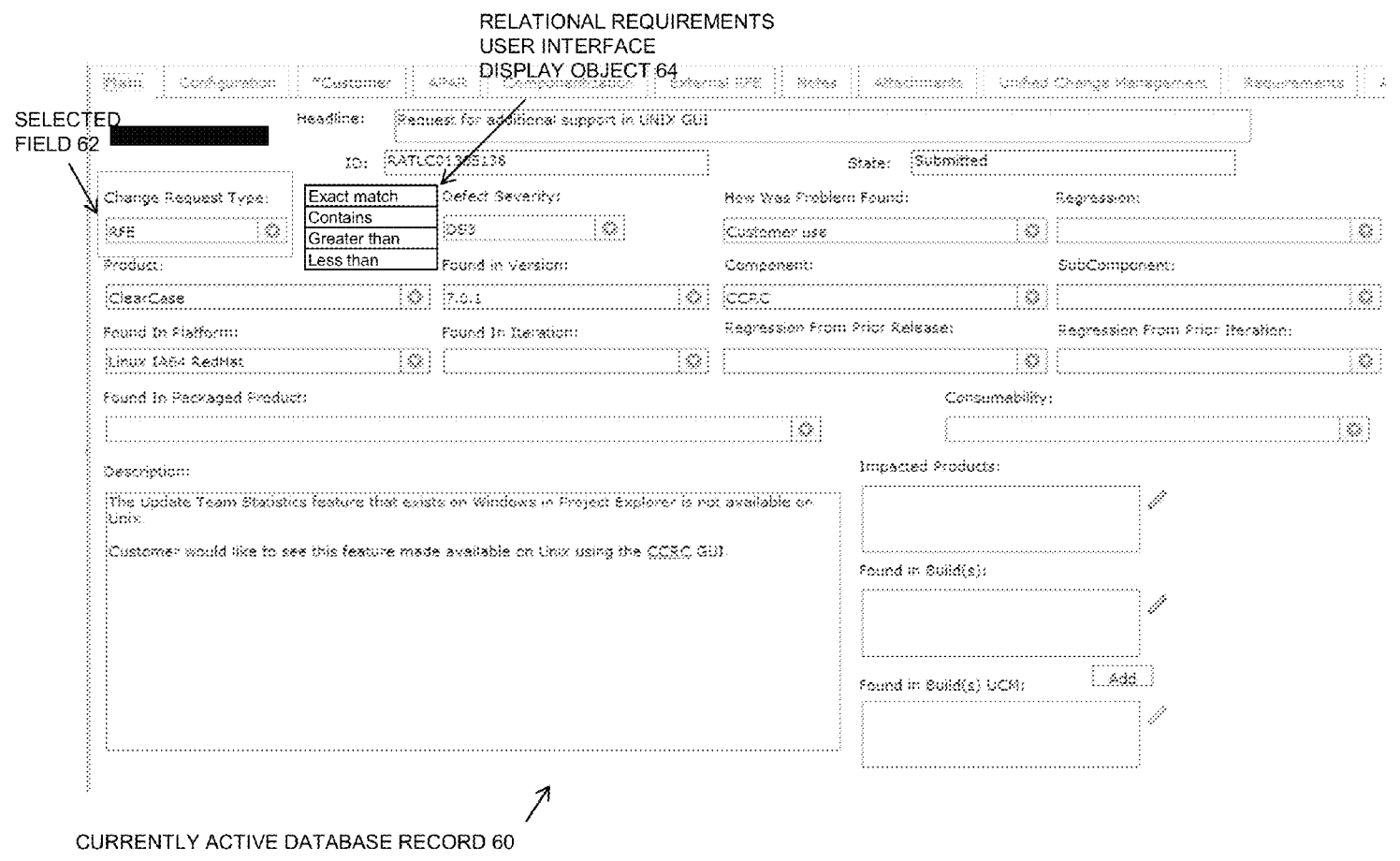

FIG. 3 is a simplified screen shot showing an example of the Currently Active Database Record 20 of FIG. 1. As shown in FIG. 3, a Currently Active Database Record 60 displays the contents of multiple fields from a user selected database record. The Currently Active Database Record enables the user to select one or more of the fields in the Currently Active Database Record 60, for example by clicking on the desired field or fields.

In the example of FIG. 3, the user may be a project leader who is reviewing new change requests for a software product using a defect tracking system. The project leader user causes the Currently Active Database Record 60 to be displayed, for example by selecting it from a previously generated result set. The project leader user decides that the contents of the Currently Active Database Record 60 represent an interesting request for enhancement for a certain component. As a result, the project leader user decides that they would like to see a list of all requests for enhancement (RFEs) that this particular customer has submitted against this particular component. In order to use the disclosed system to automatically generate a search query that will retrieve the database records for all RFEs that the specific customer has submitted against the specific component, the project leader user selects or highlights the "Change Request Type:", "Component:" and "Customer Name:" fields in the current change request record she is reviewing.

As shown in FIG. 3, the project leader user first selects the "Change Request Type:" field in the Currently Active Database Record 60, shown as Selected Field 62. After the user has clicked on the "Change Request Type:" field, the visual appearance of the "Change Request Type:" field is changed to indicate that it has been selected by the user, for example by a surrounding box, highlighting, etc.

Also shown in the example of FIG. 3 is an example of a Relational Requirements User Interface Display Object 64. The Relational Requirements User Interface Display Object 64 may, for example, be generated in response to the project leader user right clicking on the Selected Field 62.

The Relational Requirements User Interface Display Object 64 of FIG. 3 is a context menu associated with Selected Field 62 that includes a number of menu options from which the user can select a relational requirement. In the embodiment of FIG. 3, the use can select from "Exact Match", "Contains", "Greater than", and "Less than" relational requirements. For example, if the user selects the "Exact Match" relational requirement, the disclosed system generates a search query such that the value of a "Change Request Type:" field in a database record in the Database 36 will be determined to meet the requirement only if it is exactly "RFE". If the user alternatively selects the "Contains" relational requirement, the disclosed system generates a search query such that the value of a "Change Request Type" field in a database record in the Database 36 will be determined to meet the requirement if it contains "RFE", even if it also contains other characters or codes. In the example of the project leader user wishing to view database records for all RFEs that the specific customer has submitted against the specific component, the user would select the "Exact Match" relational requirement for each of the selected fields ("Change Request Type:" and "Component:" as shown in FIG. 4).

Figure 4:
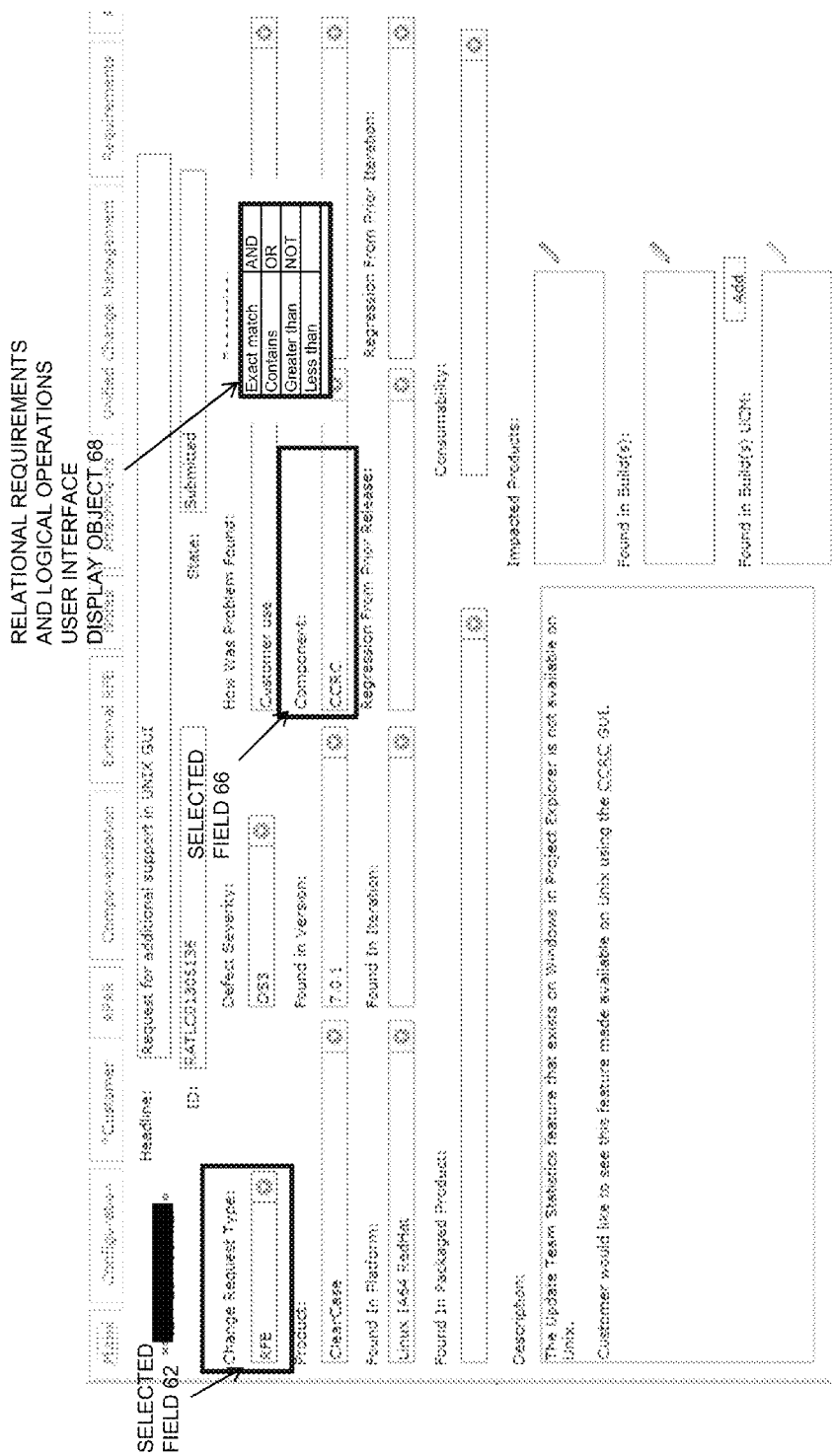
FIG. 4 is a second simplified screen shot showing examples of user interface display objects generated by an illustrative embodiment of the disclosed system.

FIG. 4 is a simplified screen shot showing a second example of the Currently Active Database Record 20 of FIG. 1. As shown in FIG. 4, the project leader user has now also selected the "Component" field in the Currently Active Database Record 60, shown as the Selected Field 66. A Relational Requirements and Logical Operations User Interface Display Object 68 may, for example, be generated in response to the user right clicking on the Selected Field 66.

The Relational Requirements and Logical Operations User Interface Display Object 68 of FIG. 4 is a context menu associated with Selected Field 66 that includes a number of menu options from which the user can select a relational requirement to be associated with Selected Field 66, as well as a logical operation to be applied to Selected Field 66 and the previously selected Selected Field 62. In the embodiment of FIG. 4, the user can select from "Exact Match", "Contains", "Greater than", and "Less than" relational requirements, as well as "AND", "OR" and "NOT" logical operations.

If the user selects the "AND" logical operation, the disclosed system generates a search query such that a record in the Database 36 will be considered a match if the value of a "Change Request Type:" field and the value of a "Component" field in that database record meet the relational requirements associated with the contents of Selected Field 62 and Selected Field 66 in the Currently Active Database Record 60. For example, if the user has selected the "Exact Match" relational requirement for both the contents of Selected Field 62 and the contents of Selected Field 66, and then selects the "AND" logical operation, then a search query is generated such that a record will be considered a match only if the contents of both the "Change Request Type:" and "Component" fields in the record exactly match "RFE" and "CCRC" respectively. In the example where a project leader user wishes to retrieve all database records matching the contents of the "Change Request Type:", "Component" and "Customer Name:" fields, the "AND" logical operation is selected from the Relational Requirements and Logical Operations User Interface Display Object 68, so that a search query will eventually be generated that retrieves database records having both a value of "RFE" in their "Change Request Type:" field and also a value of "CCRC" in their "Component:" field.

Alternatively, if the user has selected the "Exact Match" relational requirement for both the contents of Selected Field 62 and the contents of Selected Field 66, and then selects the "OR" logical operation, then a search query will be generated such that a record will be considered a match if either the contents of the "Change Request Type:" field exactly matches "RFE" or the contents of the "Component" field exactly matches "CCRC". And if the user has selected the "Exact Match" relational requirement for both the contents of Selected Field 62 and the contents of Selected Field 66, and then selects the "NOT" logical operation, then a search query will be generated such that a record will be considered a match if the contents of the "Change Request Type:" field exactly matches "RFE" and the contents of the "Component" field does not match "CCRC".

As shown by the simplified screen shot in FIG. 5, in an embodiment in which the Currently Active Database Record 20 is provided through a tabbed user interface, the user may select fields from windows associated with different tabs. In the Second Tab of Currently Active Database Record 60, the project leader user has now selected "Customer Name:" field from the Currently Active Database Record 70, shown as Selected Field 72. As also shown in FIG. 5, the disclosed system has now generated a Relational Requirements and Logical Operations User Interface Display Object 74, for example in response to the user right clicking on the Selected Field 72. In the example where a project leader user wishes to retrieve all database records matching the contents of the "Change Request Type:", "Component" and "Customer Name:" fields, the "Exact Match" relational requirement and the "AND" logical operation are selected from the Relational Requirements and Logical Operations User Interface Display Object 74, so that a search query is generated that retrieves all database records having a value of "RFE" in their "Change Request Type:" field, a value of "CCRC" in their "Component:" field, and a value of "Sample Company" in their "Customer Name:" field. The user then indicates that they are done selecting fields, relational requirements, and logical operations, and the disclosed system operates to generate a search query based on the field, relational requirements and logical operations indicated by the user through the display objects shown in FIGS. 3-5. For example, an additional context menu item, button, or other specific type of user interface display object may be generated within the Database Application User Interface 18, and when selected (e.g. clicked on) by the user, indicate to the disclosed system that the user is done selecting fields, relational requirement and logical operations, and that the disclosed system should go ahead and generate the search query reflecting the selected fields, relational requirements and logical operations and submit it to the database management system.

In this way the examples of FIGS. 3-5 show how the disclosed system may be embodied and used to automatically generate a search query that will retrieve the database records in a defect database for all RFEs that the specific customer has submitted against the specific component, the project leader user selects or highlights the "Change Request Type:", "Component:" and "Customer Name:" fields in the current change request record she is reviewing.

While the above description makes reference to a defects database, the disclosed system is not so limited. Accordingly, one skilled in the art will recognize that the disclosed system may be embodied to be used with any specific kind of database and/or data stored within a database.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method embodied in at least one computer system for dynamically creating queries to find related records in a database, including steps performed by said computer system comprising:

receiving a first search query from a user;

retrieving and displaying a result set of database records from said database responsive to said first search query, said result set containing database records matching criteria in said first search query, and wherein fields in said database records in said result set contain values retrieved from said database;

detecting, from said user, selection of a currently active database record within said result set;

displaying said currently active database record responsive to said user selecting said currently active database record from said previously generated result set of database records retrieved from said database, by opening a separate tabbed user interface window for independently displaying said currently active database record and displaying said currently active database record within said separate tabbed user interface window;

receiving a first user indication from said user, said first user indication indicating a plurality of user selected fields in said currently active database record;

displaying at least one user interface object over said currently active database record, said user interface object including a list of relational requirements and a list of logical operations, said user interface object enabling said user to indicate a selected one of said listed relational requirements for each of said user selected fields, and to indicate a selected one of said list of logical relationships to be associated with multiple ones of said user selected fields in said currently active database record;

generating a second search query requesting all records in said database both having values in said user selected fields that meet each of said user selected relational requirements with regard to values contained in said user selected fields in said currently active database record, and that also satisfy said selected one of said logical relationships between multiple ones of said user selected fields;

retrieving and displaying a second result set of database records from said database responsive to said second search query;

changing, in response to said first user indication, a visual appearance of each of said plurality of user selected fields in said currently active database record;

one of said user selected fields in said currently active database record receiving, subsequent to said first user indication, a second user indication, wherein said second user indication comprises a right-click operation; and wherein said displaying of said user interface object including said list of relational requirements and said list of logical operations is in response to said one of said user selected fields in said currently active database record receiving said second user indication.

2. The method of claim 1, further comprising:

wherein one of said user selected relational requirements comprises an exact match requirement for one of said user selected fields; and wherein said exact match requirement is met by a value in said one of said user selected fields in said records in said database that exactly matches a current value of said one of said user selected fields in said currently active database record.

3. The method of claim 1, further comprising:

wherein one of said user selected relational requirements comprises a contains requirement for one of said user selected fields; and wherein said contains requirement is met by said one of said user selected fields in said records in said database that contains a current value of said one of said user selected fields in said currently active database record.

4. The method of claim 1, further comprising:

wherein one of said at least one user selected relational requirements comprises a greater than requirement for one of said user selected fields; and wherein said greater than requirement is met by said one of said user selected fields in said records in said database that contains a value that is greater than a current value of said one of said user selected fields in said currently active database record.

5. The method of claim 1, further comprising:

wherein one of said at least one user selected relational requirements comprises a less than requirement for one of said user selected fields; and wherein said less than requirement is met by said one of said user selected fields in said records in said database that has a value less than a current value of said one of said user selected fields in said currently active database record.

6. The method of claim 1, further comprising:

wherein said at least one user selected logical operation comprises a logical AND operation between a first one and a second one of said user selected fields; and wherein said logical AND operation is satisfied for a given record in said database only when relational requirements for said first one and said second one of said user selected fields are met by values in corresponding fields in said record in said database.

7. The method of claim 1, further comprising:

wherein said at least one user selected logical operation comprises a logical OR operation between a first one and a second one of said user selected fields; and wherein said logical OR operation is satisfied for a given record in said database when a relational requirement for either said first one or said second one of said user selected fields is met by a value in a corresponding field in said record in said database.

8. The method of claim 1, further comprising:

wherein said at least one user selected logical operation comprises a logical NOT operation between a first one and a second one of said user selected fields; and wherein said logical NOT operation is satisfied for a given record in said database when a relational requirement for a first one of said user selected fields is met by a value in a corresponding field in said record in said database but a relational requirement for a second one of said user selected fields is not met by a value in a corresponding field in said record in said database.

9. The method of claim 1, further comprising:

persistently storing said search query such that said user can access and submit said search query again in the future.

10. An apparatus comprising:

at least one processor and at least one computer readable memory, said computer readable memory having program code stored thereon for, when executed by said processor, causing said processor to dynamically create queries to find related records in a database, said program code including program code for receiving a first search query from a user, program code for retrieving and displaying a result set of database records from said database responsive to said first search query, said result set containing database records matching criteria in said first search query, and wherein fields in said database records in said result set contain values retrieved from said database, program code for detecting, from said user, selection of a currently active database record within said result set, program code for displaying said currently active database record responsive to said user selecting said currently active database record from said previously generated result set of database records retrieved from said database, by opening a separate tabbed user interface window for independently displaying said currently active database record and displaying said currently active database record within said tabbed user interface window, program code for receiving a first user indication from said user, said first user indication indicating a plurality of user selected fields in said currently active database record, program code for displaying at least one user interface object over said currently active database record, said user interface object including a list of relational requirements and a list of logical operations, said user interface object enabling said user to indicate a selected one of said listed relational requirements for each of said user selected fields, and to indicate a selected one of said list of logical relationships to be associated with multiple ones of said user selected fields in said currently active database record, program code for generating a second search query requesting all records in said database both having values in said user selected fields that meet each of said user selected relational requirements with regard to values contained in said user selected fields in said currently active database record, and that also satisfy said selected one of said logical relationships between multiple ones of said user selected fields, program code for retrieving and displaying a second result set of database records from said database responsive to said second search query, program code for changing, in response to said first user indication, a visual appearance of each of said plurality of user selected fields in said currently active database record, program code for, by one of said user selected fields in said currently active database record, receiving, subsequent to said first user indication, a second user indication; and wherein said program code for displaying said user interface object including said list of relational requirements and said list of logical operations displays said user interface object including said list of relational requirements and said list of logical operation in response to said one of said user selected fields in said currently active database record receiving said second user indication.

11. The apparatus of claim 10, further comprising:
wherein one of said user selected relational requirements comprises an exact match requirement for one of said user selected fields; and
wherein said exact match requirement is met by a value in said one of said user selected fields in said records in said database that exactly matches a current value of said one of said user selected fields in said currently active database record.

12. The apparatus of claim 10, further comprising:
wherein one of said user selected relational requirements comprises a contains requirement for one of said user selected fields; and
wherein said contains requirement is met by said one of said user selected fields in said records in said database that contains a current value of said one of said user selected fields in said currently active database record.

13. The apparatus of claim 10, further comprising:
wherein one of said at least one user selected relational requirements comprises a greater than requirement for one of said user selected fields; and wherein said greater than requirement is met by said one of said user selected fields in said records in said database that contains a value that is greater than a current value of said one of said user selected fields in said currently active database record.

14. The apparatus of claim 10, further comprising:
wherein one of said at least one user selected relational requirements comprises a less than requirement for one of said user selected fields; and
wherein said less than requirement is met by said one of said user selected fields in said records in said database that has a value less than a current value of said one of said user selected fields in said currently active database record.

15. The apparatus of claim 10, further comprising:
wherein said at least one user selected logical operation comprises a logical AND operation between a first one and a second one of said user selected fields; and
wherein said logical AND operation is satisfied for a given record in said database only when relational requirements for said first one and said second one of said user selected fields are met by values in corresponding fields in said record in said database.

16. The apparatus of claim 10, further comprising:
wherein said at least one user selected logical operation comprises a logical OR operation between a first one and a second one of said user selected fields; and
wherein said logical OR operation is satisfied for a given record in said database when a relational requirement for either said first one or said second one of said user selected fields is met by a value in a corresponding field in said record in said database.

17. The apparatus of claim 10, further comprising:
wherein said at least one user selected logical operation comprises a logical NOT operation between a first one and a second one of said user selected fields; and
wherein said logical NOT operation is satisfied for a given record in said database when a relational requirement for a first one of said user selected fields is met by a value in a corresponding field in said record in said database but a relational requirement for a second one of said user selected fields is not met by a value in a corresponding field in said record in said database.

18. The apparatus of claim 10, wherein said program code for, when executed by said processor, causing said processor to dynamically create queries to find related records in a database, further includes:
program code for persistently storing said search query such that said user can access and submit said search query again in the future.

* * * * *